United States Patent [19]

Schneider

[11] Patent Number: 5,630,621

[45] Date of Patent: May 20, 1997

[54] KNEE BAG COVER RETENTION DESIGN

[75] Inventor: David W. Schneider, Waterford, Mich.

[73] Assignee: Morton International, Inc., Chicago, Ill.

[21] Appl. No.: 728,136

[22] Filed: Jul. 12, 1996

[51] Int. Cl.[6] ............................................. B60R 21/045
[52] U.S. Cl. ........................ 280/753; 280/751; 280/730.1
[58] Field of Search ................................. 280/753, 751, 280/752, 732, 728.1, 748, 730.1

[56] References Cited

U.S. PATENT DOCUMENTS

| | | | |
|---|---|---|---|
| 3,702,706 | 11/1972 | Sobkow | 280/730.1 |
| 4,198,075 | 4/1980 | Kob et al. | 280/753 |
| 4,948,168 | 8/1990 | Adomeit et al. | 280/732 |
| 5,324,070 | 6/1994 | Kitagawa et al. | 280/730 R |
| 5,344,184 | 9/1994 | Keeler et al. | 280/730 R |
| 5,458,366 | 10/1995 | Hock et al. | 280/729 |
| 5,480,183 | 1/1996 | Ward et al. | 280/728.2 |
| 5,482,344 | 1/1996 | Walker et al. | 280/751 X |
| 5,536,043 | 7/1996 | Lang et al. | 280/753 |

*Primary Examiner*—Christopher P. Ellis
*Attorney, Agent, or Firm*—Lawrence I. Field; Gerald K. White

[57] ABSTRACT

A knee bag cushion is attached to a bolster panel or cushion cover by providing channels on an inner face of the bolster panel and providing retention rods on the outside of the knee bag cushion. The rods are attached to the cushion by passing through loops sewed to the cushion. The retention rods are assembled to the channels by sliding or snapping in the cushion with the rods into the channels on the bolster panel.

7 Claims, 2 Drawing Sheets

FIG. 1
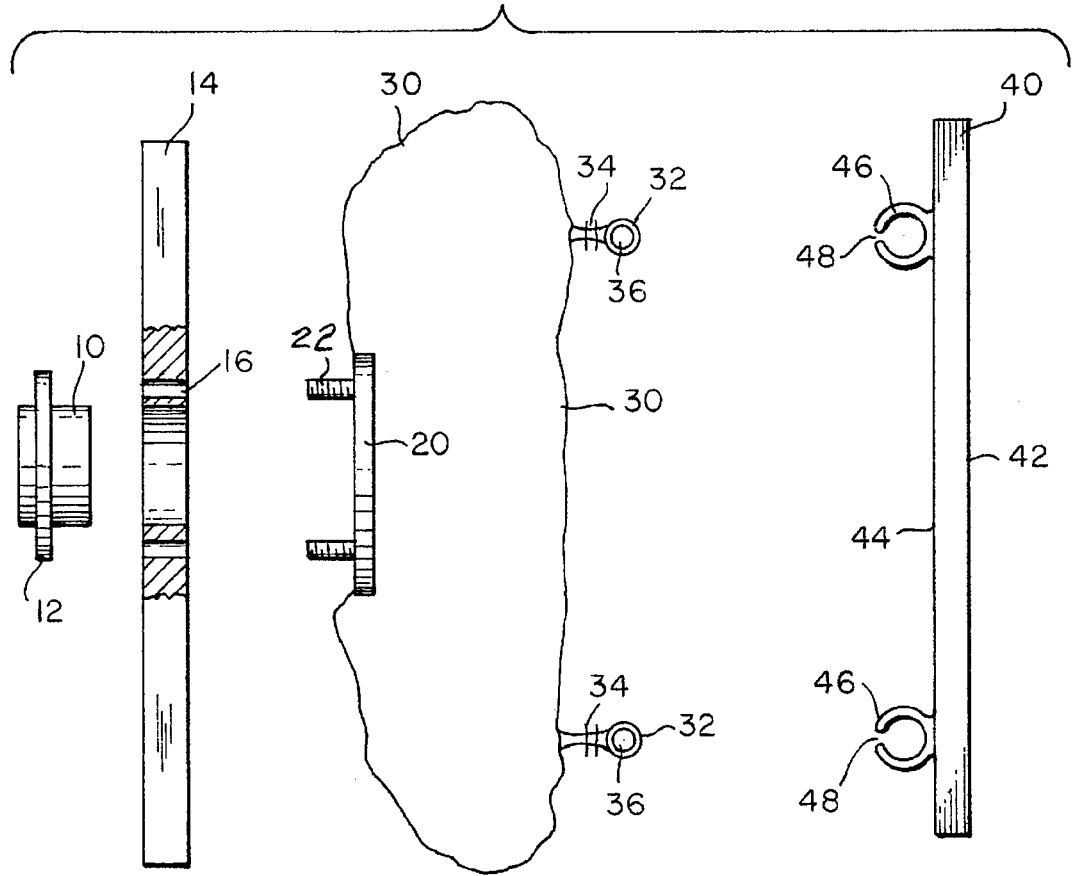
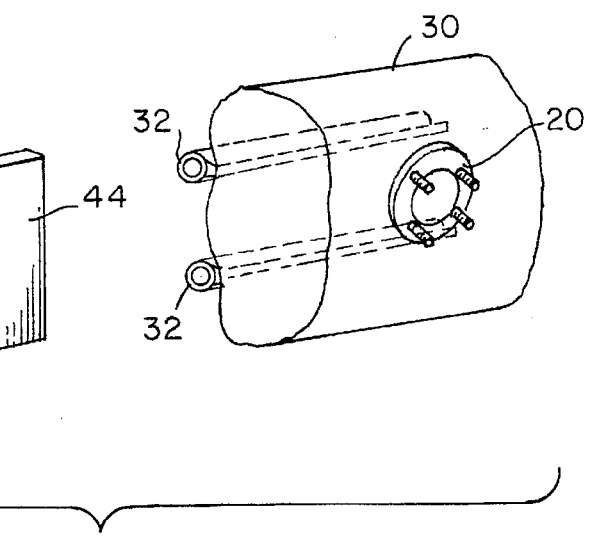
FIG. 2

KNEE BAG COVER RETENTION DESIGN

FIELD OF THE INVENTION

This invention relates to a knee bag cushion and to the manner in which it is attached to a knee bolster panel or a knee bag cover.

BACKGROUND OF THE INVENTION

Knee bolsters associated with knee bag cushions are shown in the following issued United States Patents:

Kob et al U.S. Pat. No. 4,198,075 issued Apr. 15, 1980

Adomeit et al U.S. Pat. No. 4,948,168 issued Aug. 14, 1990

Kitagawa et al U.S. Pat. No. 5,324,070 issued Jul. 28, 1994

Keeler U.S. Pat. No. 5,344,184 issued Sept. 6, 1994

Hock U.S. Pat. No. 5,458,366 issued Oct. 17, 1995

Ward et al U.S. Pat. No. 5,480,183 issued Jan. 2, 1996

A principal problem which arises when the knee air bag cushion inflates, is the instability which results when the cushion balloons, and the knee bolster panel may rotate fore/aft because of the space which is created along the upper and lower edges of the bolster as will be explained below.

Another problem arises when the bolster is attached to the knee air bag cushion by an adhesive since many adhesives must be applied by special equipment and then cured.

Another of the problems that arises with the constructions shown in some of the prior art results from the top edge of a bolster panel striking the knee or tibia of an occupant of the vehicle.

Accordingly, need exists for an improved method of attaching a knee air bag cushion to a bolster or cover.

OBJECTS OF THE INVENTION

One object of the invention is to improve the stability of a knee bag cushion and bolster panel, by locating the attachment points along the top and bottom of the panel and across the width of the panel. This provides for a more distributed loading on the cushion upon filling and prevents cover "slap" due to rotation of the top portion of the panel, typically observed with the use of a circular retainer ring to secure an airbag cushion to a cover panel.

A further object of the invention is to diminish the potential for injury from an edge of a bolster or cushion cover by reducing the potential for injury due to secondary impact in the event that the cover pivots about the retainer and the top edge of the cover becomes exposed to the knee or tibia. This invention separates the attachment points which inhibits rotation of the panel about the center.

A further object is to reduce the number of components in a knee bag cushion module.

Another object is to reduce the weight of a knee bag cushion module.

A further object is to reduce the cost of material and assembly, due to the reduction in components and the improved "slide together" design of this invention.

These and other objects will be pointed out or will become apparent from the description which follows taken in conjunction with the drawings.

BRIEF DESCRIPTION OF THE DRAWINGS

In the drawings

FIG. 1 is an exploded view of a knee bag module partially in section;

FIG. 2 is a schematic view showing the manner in which the bolster and the knee bag cushion are assembled in accordance with the invention;

DESCRIPTION OF PREFERRED EMBODIMENT

Figure 5:
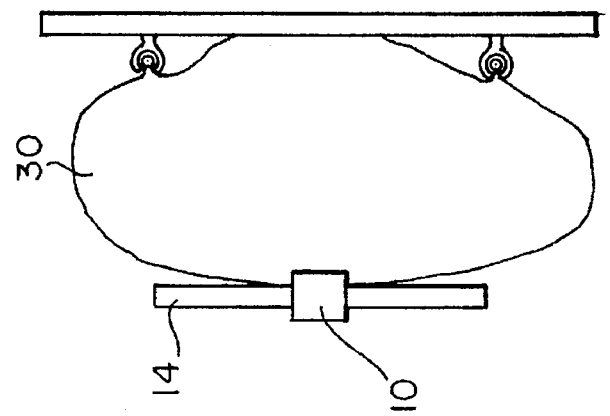
FIG. 5 is a view similar to FIG. 4 showing the knee bag/bolster construction of this invention, during inflation.

As seen in FIG. 1 the module includes a conventional inflator 10 having a flange 12 for facilitating mounting of the inflator on a support or plate 14. Plate 14 is provided with apertures 16 adapted to receive a retainer 20. Retainer 20 is held in place inside of a knee bag cushion 30 by threaded studs and attachment nuts as shown in FIG. 2, or by mechanical means associated with retainer 20. Pins 22 extend from one side of retainer 20 and through apertures 16 when the cushion is assembled to the inflator.

On the opposite side of cushion 30 a pair of tubular channels 32 are attached to one side of the cushion, e.g. by sewing 34. Each channel 32 receives a rod 36. Rods 36 and tubular channels 32 serve to anchor and stabilize a bolster panel 40. Bolster panel 40 which serves as a knee bag cover is located adjacent the instrument panel e.g. as shown in U.S. Pat. No. 5,458,366. Bolster panel may be made of cast skin and foamed plastic over a steel substrate.

One face of bolster panel 40, the outer face 42, faces the occupant of the vehicle and is generally flat. Outer face 42 may be given an ornamental finish to match the dashboard or other interior decor of the vehicle in which it is mounted. The opposite face of bolster panel 40, inner face 44, is provided with a pair of channels 46 shaped to receive retention rods 36 and the tubular channels 32 in which they are disposed. Channels 32 and rods may be slid into channels 46 or they may be snapped into channels 46 by insertion into the opening 48 of the C shaped channels. Rods 36 may be of nylon or other engineering polymer or of metal.

Figure 3:
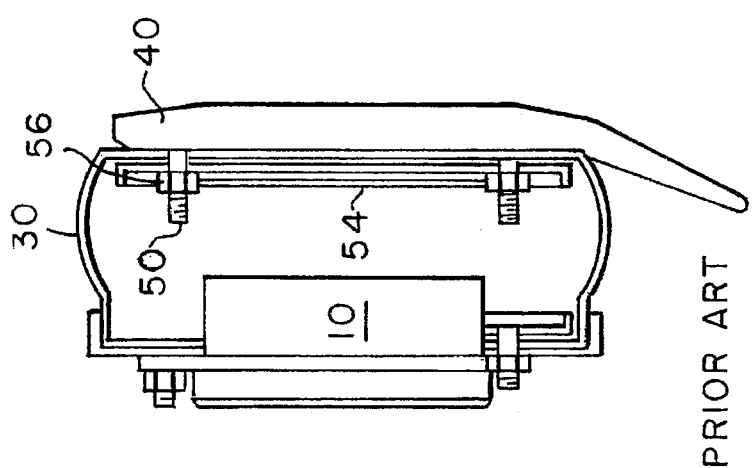
FIG. 3 is a view partly in section showing one prior art method of attaching the bolster to a knee bag cushion.

FIG. 3 illustrates one presently used (Prior Art) mechanism for attaching a knee bag cushion to a bolster panel. As shown an inflator 10 is assembled to a knee bag cushion 30. Bolster panel 40 is provided with studs 50 which extend through the cushion material. Retainer plate 54 with clearance holes is secured to the bolster panel 40 by means of attachment nuts 56. The attachment nuts are then torqued down, thereby clamping the cushion material between the retainer ring and the bolster panel. This operation may be difficult as the ring and attachment nuts are inside the cushion and access is through the relatively small opening in the cushion for the inflator.

Figure 4:
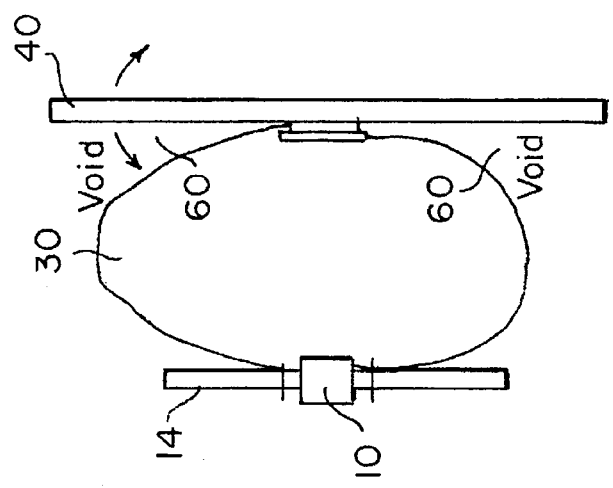
FIG. 4 is a schematic view of a prior art knee bag/bolster construction during inflation.

FIG. 4 illustrates the assembly of FIG. 3 after the cushion material inflates. Due to "ballooning" of the cushion and the attachment means, large triangular shaped voids 60 exist between the cushion and the bolster panel upon inflation. As observed in previous tests, this causes an unstable bolster and cushion because of rotation of the bolster about the retainer.

FIG. 5 is a view similar to FIG. 4 showing the effect of the rod/channel attachment of the present invention. It will be seen that the separation of the attachment points impedes rotation of bolster panel 40. This construction more equally distributes the force on the bolster panel from cushion pressure due to the increased area on the back of the bolster panel which the cushion contacts.

There are no large triangular shaped voids between the cushion and bolster panel, therefore the assembly is more stable and less likely to rotate fore/aft.

By the present construction a knee bag module is provided which has great stability and which is simple to assemble from components including an inflator, a knee bag cushion and a bolster panel or cushion cover.

Having now described the invention it is not intended that it be limited except as may be required by the appended claims:

I claim:

1. An automotive vehicle knee bag cushion/knee bolster assembly with enhanced stability which includes:

a knee bolster panel or cover, at least two spaced channels secured to said bolster panel or cover, a knee bag cushion, and at least two retention rods attached to the outside of said cushion, whereby when said retention rods are slid into said channels, said bolster panel is secured to said knee bag cushion.

2. The assembly of claim 1 in which loops are secured onto said cushion for mounting said retention rods.

3. The assembly of claim 1 in which said retention rods extend lengthwise of said knee bolster panel, i.e., transversely of said automotive vehicle.

4. The assembly of claim 1 in which said retention rods are nylon.

5. The assembly of claim 1 including means to inflate said cushion.

6. The assembly of claim 1 in which said channels have a C shape adapted to receive said rods.

7. A method of assembling a knee bag bolster to a knee bag cushion which comprises:

securing at least two channels to one exterior surface of said bolster panel, securing at least two retention rods to the exterior of said knee bag cushion, and sliding or snapping said rods into said channels to assemble said bolster panel and said knee bag cushion.

\* \* \* \* \*